United States Patent
Kondor et al.

(10) Patent No.: US 11,934,478 B2
(45) Date of Patent: Mar. 19, 2024

(54) FULLY FOURIER SPACE SPHERICAL CONVOLUTIONAL NEURAL NETWORK BASED ON CLEBSCH-GORDAN TRANSFORMS

(71) Applicant: The University of Chicago, Chicago, IL (US)

(72) Inventors: Imre Kondor, Chicago, IL (US); Shubhendu Trivedi, Chicago, IL (US); Zhen Lin, Chicago, IL (US)

(73) Assignee: The University of Chicago, Chicago, IL (US)

( * ) Notice: Subject to any disclaimer, the term of this patent is extended or adjusted under 35 U.S.C. 154(b) by 528 days.

(21) Appl. No.: 17/253,840

(22) PCT Filed: Jun. 20, 2019

(86) PCT No.: PCT/US2019/038236
§ 371 (c)(1),
(2) Date: Dec. 18, 2020

(87) PCT Pub. No.: WO2019/246397
PCT Pub. Date: Dec. 26, 2019

(65) Prior Publication Data
US 2021/0272233 A1 Sep. 2, 2021

Related U.S. Application Data
(60) Provisional application No. 62/688,200, filed on Jun. 21, 2018.

(51) Int. Cl.
G06F 17/14 (2006.01)
G06F 18/214 (2023.01)
(Continued)

(52) U.S. Cl.
CPC ............ *G06F 17/14* (2013.01); *G06F 18/214* (2023.01); *G06N 3/04* (2013.01); *G06N 3/08* (2013.01); *G06T 3/0012* (2013.01); *G06T 15/08* (2013.01)

(58) Field of Classification Search
CPC ......... G06F 17/14; G06F 18/214; G06N 3/04; G06N 3/08; G06T 3/0012; G06T 15/08
See application file for complete search history.

(56) References Cited

U.S. PATENT DOCUMENTS 9,418,458 B2    8/2016 Chertok et al.
11,270,425 B2*  3/2022 Liao ...................... G06F 18/245
(Continued)

OTHER PUBLICATIONS

Thomas, Nathaniel, et al. "Tensor field networks: Rotation- and translation-equivariant neural networks for 3d point clouds." arXiv preprint arXiv:1802.08219 (2018). (Year: 2018).*
(Continued)

*Primary Examiner* — Utpal D Shah
(74) *Attorney, Agent, or Firm* — McDonnell Boehnen Hulbert & Berghoff LLP

(57) ABSTRACT

Methods and systems for computationally processing data with a multi-layer convolutional neural network (CNN) having an input and output layer, and one or more intermediate layers are described. Input data represented in a form of evaluations of continuous functions on a sphere may be received at a computing device and input to the input layer. The input layer may compute outputs as covariant Fourier space activations by transforming the continuous functions into spherical harmonic expansions. The output activations from the input layer may be processed sequentially through each of the intermediate layers. Each, intermediate layer may apply Ciebsch-Gordan transforms to compute respective covariant Fourier space activations as input to an immediately next layer, without computing any intermediate
(Continued)

inverse Fourier transforms or forward Fourier transforms. Finally, the respective covariant Fourier space activations of the last intermediate layer may be processed in the output layer of the CNN to compute invariant activations.

20 Claims, 5 Drawing Sheets

(51) Int. Cl.
    *G06N 3/04*     (2023.01)
    *G06N 3/08*     (2023.01)
    *G06T 3/00*     (2006.01)
    *G06T 15/08*     (2011.01)

(56) References Cited

U.S. PATENT DOCUMENTS

2017/0300785 A1   10/2017   Merhav et al.
2020/0402607 A1*  12/2020   Kondor .................. G06N 5/046
2021/0089923 A1*   3/2021   Kicanaoglu ........... G06F 17/153

OTHER PUBLICATIONS

Kondor, Risi. "N-body networks: a covariant hierarchical neural network architecture for learning atomic potentials." arXiv preprint arXiv:1803.01588 (2018). (Year: 2018).*
LeCun et al., Backpropagation Applied to Handwritten Zip Code Recognition. Neural Computation, 1:541-551, 1989. Massachusetts Institute of Technology.
Gens et al., Deep Symmetry Networks. NIPS 2014, pp. 1-9, 2014.
Cohen et al., Group Equivariant Convolutional Networks. Proceedings of the 33rd International Conference on Machine Learning, 48:2990-2999, 2016.
Cohen et al., Steerable CNNs. Published as a conference paper at ICLR, 2017.
Ravanbakhsh et al., Equivariance Through Parameter-Sharing. Proceedings of International Conference on Machine Learning, 2017.
Kondor et al., On the Generalization of Equivariance and Convolution in Neural Networks to the Action of Compact Groups. Proceedings of the 35th International Conference on Machine Learning, 2018.
Cohen et al., Spherical CNNs. Published as a conference paper at ICLR 2018, p. 1-15.
Zelnik-Manor et al., Squaring the Circle in Panoramas. IProceedings of the Tenth IEEE International Conference on Computer Vision (ICCV'05), pp. 1292-1299, 2005.
Cruz-Mota et al., Scale Invariant Feature Transform on the Sphere: Theory and Applications. International Journal of Computer Vision (2012) 98(2):217-241.
Su et al., Pano2Vid: Automatic Cinematography for Watching 3600 videos. Lecture Notes in Computer Science (including subseries Lecture Notes in Artificial Intelligence and Lecture Notes in Bioinformatics), 10114 LNCS(1):154-171, 2017.
Lai et al., Semantic-Driven Generation of Hyperlapse from 360 Degree Video. IEEE Transactions on Visualization and Computer Graphics, vol. 24, No. 9, Sep. 2018 pp. 1-12.
Khasanova et al., Graph-Based Classification of Omnidirectional Images. IEEE International Conference on Computer Vision Workshops, 2017, p. 860-869.
Boomsma et al., Spherical convolutions and their application in molecular modelling. 31st Conference on Neural Information Processing Systems (NIPS 2017), p. 1-11.
Su et al., Making 360° Video Watchable in 2D: Learning Videography for Click Free Viewing. 2017 IEEE Conference on Computer Vision and Pattern Recognition, p. 1368-1376.
Healy Jr. et al., An FFT for the 2-Sphere and Applications. IEEE International Conference on Acoustics, Speech, and Signal Processing Conference Proceedings, vol. 3, pp. 1323-1326 vol. 3, May 1996.
Kostelec et al., FFTs on the Rotation Group. Journal of Fourier Analysis and Applications, 14(2):145-179, Apr. 2008.
Worrall et al., Harmonic Networks: Deep Translation and Rotation Equivariance. Dec. 14, 2016, p. 1-9.
Esteves et al., Polar Transformer Networks. Published as a conference paper at ICLR 2018, p. 1-14.
Chang et al., Shapenet: An Information-Rich 3D Model Repository, Dec. 9, 2015.
Thomas et al., Tensor field networks: Rotation and translation-equivariant neural networks for 3D point clouds. arXiv:1802.08219v3, May 18, 2018.
Kondor, Risi; N-Body Networks: A Covariant Hierarchical Neural Network Architecture for Learning Atomic Potentials. Mar. 5, 2018.
Masci et al., Geodesic Convolutional Neural Networks on Riemannian Manifolds. 2015.
Monti et al., Geometric Deep Learning on Graphs and Manifolds Using Mixture Model CNNs. Dec. 6, 2016.
Gutman et al., Shape Registration with Spherical Cross Correlation. 2nd MICCAI Workshop on Mathematical Foundations of Computational Anatomy, pp. 56-67, 2008.
Savva et al., SHREC'17 Track Large-Scale 3D Shape Retrieval from ShapeNet core55. Eurographics Workshop on 3D Object Retrieval, 2017.
Diaconis, Persi; Group Representation in Probability and Statistics, Lecture Notes-Monograph Series, 1988, vol. 11, Group Representations in Probability and Statistics.
Ioffe et al., Batch Normalization: Accelerating Deep Network Training by Reducing Internal Covariate Shift. Proceedings of the 32nd International Conference on Machine Learning, Lille France, 2015. JMLR: W&WP vol. 37.
Kingma et al., Adam: A Method for Stochastic Optimization. International Conference on Learning Representations, Jul. 23, 2015, p. 1-15.
Blum et al., 970 Million Druglike Small Molecules for Virtual Screening in the Chemical Universe Database GDB-13. Journal of the American Chemical Society, 131, 8732-8733, 2009.
Rupp et al., Fast and Accurate Modeling of Molecular Atomization Energies with Machine Learning. Physical Review Letters, Feb. 3, 2012.
Driscoll et al., Computing Fourier Transforms and Convolutions on the 2-Sphere. Advances in Applied Mathematics, 15, 202-250, 1994.
Zaheer et al., Deep Sets. 31st Conference on Neural Information Processing Systems (NIPS 2017).
Montavon et al., Learning Invariant Representations of Molecules for Atomization Energy Prediction. NIPS, 2012.
Raj et al. Local Group Invariant Representations via Orbit Embeddings. Proceedings of the 20th International Conference on Artificial Intelligence and Statistics (AISTATS) 2017.
Steves, Carlos, Christine Allen-Blanchette, Ameesh Makadia, and Kostas Daniilidis. "3D object classification and retrieval with Spherical CNNs." arXiv preprint arXiv:1711.06721 (2017).
PCT International Search Report and Written Opinion, Application No. PCT/ US2019/038236, dated Sep. 9, 2019, 15 pages.
Khorshidi, Alireza, et al. "Amp: A modular approach to machine learning in atomistic simulations." Computer Physics Communications 207, 2016, pp. 310-324, 15 pages.
Quito Jr., Marcelino, et al. "Solving N-body problems with neural networks." Physical Review Letters, May 21, 2001, 86-21 p. 4741, 4 pages.
Schutt, Kristof, et al. "Schnet: A continuous-filter convolutional neural network for modeling quantum interactions." Advances in neural information processing systems 30, 2017, 11 pages.
Torlai, Giacomo, et al. "Neural-network quantum state tomography for many-body systems." arXiv: 1703.05334v2, 2017, 15 pages.

* cited by examiner

FULLY FOURIER SPACE SPHERICAL CONVOLUTIONAL NEURAL NETWORK BASED ON CLEBSCH-GORDAN TRANSFORMS

CROSS-REFERENCE TO RELATED APPLICATIONS

This application is a national stage entry of, and claims priority to, PCT/US19/38236, filed on Jun. 20, 2019, which claims priority under 35 U.S.C. § 119(e) to U.S. Provisional Patent Application Ser. No. 62/688,200, filed on Jun. 21, 2018, both of which are incorporated herein in their entirety by reference.

BACKGROUND

Convolutional neural networks (CNN) may be used in a variety of computer vision and related tasks. In a typical configuration, a CNN may include multiple sequentially-connected layers in which the outputs of one layer, referred to as "activations," are the inputs to the next layer. In each layer, the output activations are computed by mathematically convolving or cross-correlating the previous layer's activations with a filter, and then applying a nonlinearity to the resulting convolution or cross-correlation. The input data may correspond to measurements as a function of some spatial coordinates, such as image pixels in a plane, and may be mathematically represented by one or more continuous functions defined over the space described by the coordinates. In this somewhat generalized description, the convolution of the filter with the previous layer's activations involves translating the filter over some displacement in or across the space in or on which the input functions are defined, and thereby obtaining a measure of how well the filter matches the activations in the region of translation. Carrying out this operation at successive layers of the CNN with different filters having different characteristics can be used for recognition of hierarchical structure as captured through the filter characteristics applied successively at each CNN layer.

SUMMARY

A complete understanding of how deep neural networks are able to achieve apparently very good performance on a wide range of learning problems has generally lagged other advancements in fields of and related to deep learning. Nevertheless, it seems fairly clear that certain architectures pick up on natural invariances in data, and that this appears to be a significant component of their success. An example is Convolutional Neural Networks (CNNs) for image classification. In particular, each layer of a CNN realizes two simple operations: a linear one consisting of convolving the previous layer's activations with a (typically small) learnable filter, and a nonlinear but pointwise one, such as a ReLU operator. This architecture is sufficient to ensure "translation equivariance," meaning that if the input image is translated by some vector t, then the activation pattern in each higher layer of the network will translate by the same amount. Equivariance is important to image recognition for two closely related reasons: (a) It ensures that exactly the same filters are applied to each part the input image regardless of position. (b) Assuming that finally, a translationally "invariant" layer is added at the very top of the network, the entire network will be invariant, ensuring that it can detect any given object equally well regardless of its location. Described in this way, a CNN is sometimes referred to as a "classical CNN."

Recent research examining equivariance from the theoretical point of view has been motivated by the understanding that the natural way to generalize convolutional networks to other types of data will likely lead through generalizing the notion of equivariance itself to other transformation groups. Letting $f^s$ denote the activations of the neurons in layer s of a hypothetical generalized convolution-like neural network, mathematically, equivariance to a group G means that if the inputs to the network are transformed by some transformation $g \in G$, then $f^s$ transforms to $T_g^s(f^s)$ for some fixed set of linear transformations $\{T_g^s\}_{g \in G}$ (Note that in some contexts this is called "covariance," though the difference between the two words may be considered only one of emphasis.)

A recent success of this approach are Spherical CNNs, which are an SO(3)-equivariant neural network architecture for learning images painted on the sphere. Learning images on the sphere in a rotation invariant way has applications in a wide range of domains from 360 degree video through drone navigation to molecular chemistry. A fundamental idea in Spherical CNNs is to generalize convolutions using the machinery of noncommutative harmonic analysis: employing a type of generalized SO(3) Fourier transform, Spherical CNNs transform the image to a sequence of matrices, and compute the spherical analog of convolution in Fourier space. This construction is appealing because it guarantees equivariance, and the resulting network have been shown to attain state of the art results on several benchmark datasets.

The inventors have recognized, however, one potential drawback of Spherical CNNs of the form proposed in some recent research; namely that the nonlinear transform in each layer still needs to be computed in "real space." Consequently, each layer of the network involves a forward and a backward SO(3) Fourier transform, which is relatively costly, and is a source of numerical errors, especially since the sphere and the rotation group do not admit any regular discretization similar to the square grid for Euclidean space.

Spherical CNNs are not be the only context in which the idea of Fourier space neural networks may be applied. From a mathematical point of view, the relevance of Fourier theoretic ideas in all these cases is a direct consequence of equivariance, specifically, of the fact that the $\{T_g^s\}_{g \in G}$ operators form a "representation" of the underlying group, in the algebraic sense of the word. In particular, it may be shown that whenever there is a compact group G acting on the inputs of a neural network, there is a natural notion of Fourier transformation with respect to G, yielding a sequence of Fourier matrices $\{F_l^s\}_l$ at each layer, and the linear operation at layer s will be equivariant to G if and only if it is equivalent to multiplying each of these matrices from the right by some (learnable) filter matrix $H_l^s$. Any other sort of operation will break equivariance. The spherical convolutions employed in some of the recent research are a special case of this general setup for SO(3), and the ordinary convolutions employed in classical CNNs are a special case for the integer translation group $\mathbb{Z}^2$. The inventors have further recognized that in all of these cases, however, the issue remains that the nonlinearities need to be computed in "real space," necessitating repeated forward and backward Fourier transforms.

Accordingly, the inventors disclose herein a spherical CNN that differs from other recent research the field spherical CNNs in two fundamental ways.

First, while retaining the connection to noncommutative Fourier analysis, the approach disclosed herein relaxes the requirement that the activation of each layer of the network needs to be a (vector valued) function on SO(3), requiring only that it be expressible as a collection of some number of SO(3)-covariant vectors, referred to herein as "fragments," corresponding to different irreducible representations of the group. In this sense, the proposed architecture is strictly more general than other recent spherical CNN architectures.

Second, rather than a pointwise nonlinearity in real space, the proposed network takes the tensor (Kronecker) product of the activations in each layer followed by decomposing the result into irreducible fragments using the so-called "Clebsch-Gordan decomposition." This approach yields a "fully Fourier space" neural network that avoids repeated forward and backward Fourier transforms.

Advantageously, the resulting architecture disclosed herein is not only more flexible and easier to implement than other recent spherical CNN architectures, but test experiments show that it can also perform better on some standard datasets.

While application of the Clebsch-Gordan transform has been suggested some other recent research in the area of neural networks for learning physical systems, it does not appear to have been proposed as a general purpose nonlinearity for covariant neural networks. In fact, any compact group has a Clebsch-Gordan decomposition (although, due to its connection to angular momentum in physics, the SO(3) case is by far the best known). The inventors have therefore recognized that, in principle, the methods described here could be applied much broadly than just the example presented, and more generally, in any situation where it is desirable to build a neural network that is equivariant to some class of transformations captured by a compact group.

In summary then, an important property of CNNs is that they are equivariant to translation, such that if the inputs are translated by some amount, then the activations at higher layers transform in the same way. One result is that higher layers are invariant to translations. In practical terms, for example, CNN recognition of an object captured in an image plane is not (or should not be) dependent on how that object may be translated in the image plane. For input data in a rectangular plane, constructing a CNN to maintain the property of equivariance may generally be straightforward. This is in part because translations in a rectangular plane are commutative operations.

However, for input data defined on a sphere, such as 360° images in which the image data may be conceived of as "painting" the inner surface of a spherical shell as viewed from the center of the sphere, translations inherently involve rotations, and rotations are not commutative operations. That is, the outcome of multiple translation operations on a sphere generally depends on the order in which the operations are carried out. Consequently, construction of a CNN—and in particular, maintaining equivariance across the layers—for input data defined on a sphere presents a significant analytical and computational challenge.

The inventors have recognized that previous attempts to address the problem of constructing CNNs adapted to input functions defined on a sphere introduce practical computational disadvantages in terms of computing costs, among other impediments to implementation. One particular approach is to transform the input functions and higher layer activations into a form that accounts for the non-commutative properties of operations applied to the input functions' native form. Specifically, the continuous functions that describe the data on a sphere and the higher layer activations are represented by spherical harmonic expansions of the input data. This transforms the input functions and activations, as well as operations (e.g., convolutions) applied them, into Fourier space. However, in previous techniques that adopt this approach, the nonlinearity is applied in the inverse-Fourier domain (e.g., time domain). Consequently, an inverse Fourier transform of the computational result of the Fourier space convolution must be carried out at each layer of the CNN in order to apply the nonlinearity, and then a forward Fourier transform is needed to return the activation to Fourier space for input to the next layer. The resulting, repeated forward and inverse Fourier transforms carried out across multiple layers of a CNN are computationally expensive—even when implemented by efficient numerical techniques, such as fast Fourier transforms (FFTs).

The inventors have further recognized that the disadvantages of transforming back-and-forth to Fourier space across multiple CNN layers may be removed by maintaining all of the computations, including the nonlinearity operation, across all the CNN layers in Fourier space. More specifically, the inventors have developed a mathematical analysis that applies Clebsch-Gordan transforms in the calculations in each CNN layer, leading to a fully Fourier space computation of the activations and operations across all CNN layers. In doing so, the inventors have devised a CNN architecture—referred to herein as a "Clebsch-Gordan CNN"—that solves the previous problems of multiple Fourier and inverse-Fourier transforms. When implemented as a computational algorithm in a computing system, Clebsch-Gordan CNNs result in real and practical improvements in terms of reduced computational costs (e.g., resources consumed) and increased speed and efficiency, as well as in enhanced overall performance, in comparison with previous approaches.

In one respect then, example embodiments may involve a method, carried out by a computing device, for computationally processing data with a multi-layer convolutional neural network (CNN) implemented in the computing device and having an input layer, an output layer, and one or more intermediate layers, the method comprising: at the computing device, receiving digital image data corresponding to input data that are represented in a form of evaluations of one or more continuous functions on a sphere; inputting the input data to the input layer; computing outputs of the input layer as covariant Fourier space activations by analytically transforming the one or more continuous functions into spherical harmonic expansions of the data; processing the covariant Fourier activations from the input layer sequentially through each of the one or more intermediate layers of the CNN, from the first intermediate layer to the last intermediate layer, wherein each intermediate layer is configured to apply Clebsch-Gordan transforms to compute respective covariant Fourier space activations as input to an immediately next layer of the CNN, without computing any intermediate inverse Fourier transforms or forward Fourier transforms; and processing the respective covariant Fourier space activations of the last intermediate layer in the output layer of the CNN to compute invariant activations.

In another respect, example embodiments may involve a computing system configured for computationally processing data with a multi-layer convolutional neural network (CNN), the computing system comprising: one or more processors; and memory configured to store computer-executable instructions that, when executed by the one or more processors, cause the computing system to carry out operations including: implementing the multi-layer CNN in an architectural form having an input layer, an output layer, and one or more intermediate layers, from a first intermediate layer to a last intermediate layer; receiving digital image data corresponding to input data that are represented in a form of evaluations of one or more continuous functions on a sphere; at the input layer: inputting the input data to the input layer; computing covariant Fourier space activations by analytically transforming the one or more continuous functions into spherical harmonic expansions of the input data; and outputting the computed covariant Fourier space activations to the first intermediate layer; at each intermediate layer: receiving as input activations from an immediately-preceding layer of the CNN; processing the received input activations by applying Clebsch-Gordan transforms to compute respective covariant Fourier space activations without computing any intermediate inverse Fourier transforms or forward Fourier transforms; and outputting the computed respective covariant Fourier space activations to an immediately next layer of the CNN; at the output layer: receiving as input the computed covariant Fourier space activations of the last intermediate layer; processing the received covariant Fourier activations of the last intermediate layer by computing invariant activations; and outputting the computed invariant activations.

In still another respect, example embodiments may involve a non-transitory computer-readable medium having instructions stored thereon that, when carried out by one or more processors of a computing device, cause the computing device to carry out operations including: implementing a multi-layer convolutional neural network (CNN) comprising an input layer, an output layer, and one or more intermediate layers, from a first intermediate layer to a last intermediate layer; receiving digital image data corresponding to input data that are represented in a form of evaluations of one or more continuous functions on a sphere; inputting the input data to the input layer; computing outputs of the input layer as covariant Fourier space activations by analytically transforming the one or more continuous functions into spherical harmonic expansions of the data: processing the covariant Fourier activations from the input layer sequentially through each of the one or more intermediate layers of the CNN, from the first intermediate layer to the last intermediate layer, wherein each intermediate layer is configured to apply Clebsch-Gordan transforms to compute respective covariant Fourier space activations as input to an immediately next layer of the CNN, without computing any intermediate inverse Fourier transforms or forward Fourier transforms; and processing the respective covariant Fourier space activations of the last intermediate layer in the output layer of the CNN to compute invariant activations.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
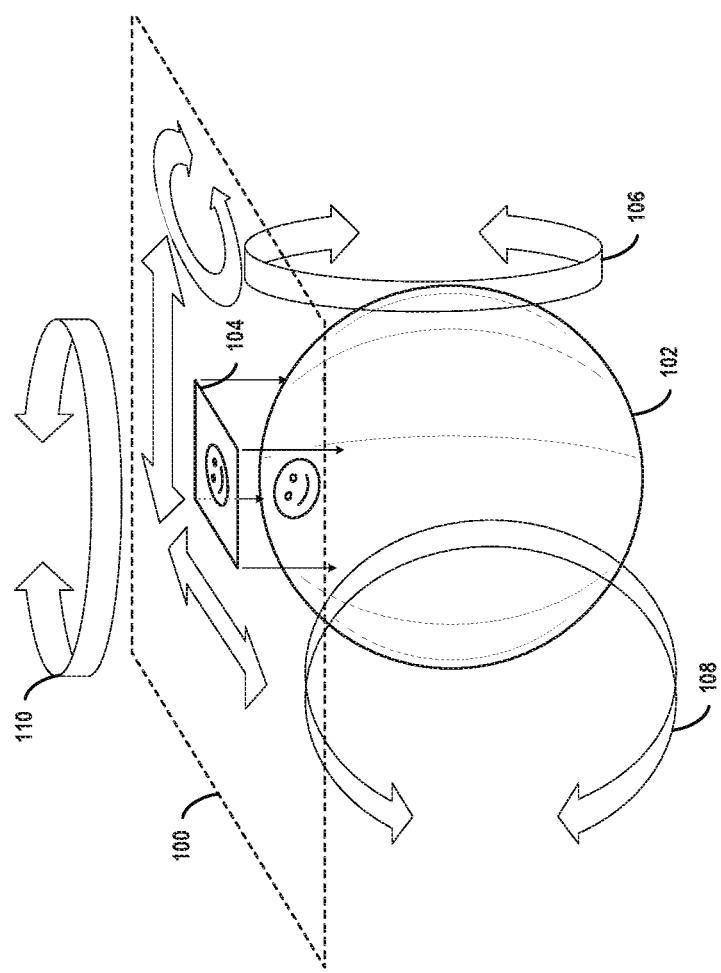
FIG. 1 is a conceptual illustration of a projection of a planar image onto the surface of a sphere, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

Example embodiments herein are directed to systems and methods for implementing fully Fourier spaced spherical convolutional neural networks. In particular, example embodiments may involve use of Clebsch-Gordan transforms to enable and/or facilitate keeping computations carried out at each intermediate layer of a CNN in Fourier space. For purposes of discussion herein, the term "Clebsch-Gordan CNN" is used as a descriptive shorthand for a fully Fourier spaced spherical convolutional neural network based on or involving Clebsch-Gordan transforms. Example embodiments may described in terms of computational algorithms, architectural designs for CNNs, computing systems in which the algorithms and architectures are carried out, and non-transitory computer-readable media on which executable instructions for carrying out the methods and implementing the architectures are stored. The mathematical details that underlie Clebsch-Gordan CNNs are described more detail below.

In addition to the specific advantages of the Clebsch-Gordan approach for enabling the fully Fourier space computations, other aspects of the overall analytical framework described below are novel and/or provide advantages over previous approaches as well. For example, the generalized SO(3)-covariant spherical CNN described herein introduces a novel approach to CNN architecture. For example, the possible ways that activations can transform at each layer may be constrained by "Definition 1" disclosed below. Specifically, the linear transform in each CNN layer must be of a form described herein by equation (16). These mathematical details have ramifications for practical implementations of spherical CNNs. In particular, they indicate that certain assumptions made in previous approaches about the mathematical forms of the solutions appear to be arbitrary, and thus not necessarily generally applicable. In contrast, the generalized SO(3)-covariant spherical CNN approach may allow the arbitrary assumptions of previous approaches to be removed, and thereby pave the way for more versatile and robust practical implementations.

Example embodiments disclosed herein may include computing systems and/or devices and methods carried out by the computing systems and/or devices. Example computing systems and/or devices may include one or more special and/or general purpose processes, volatile and non-volatile storage, including non-transient machine readable media, such as magnetic disk, solid state memory, among others. Systems may also include a user interface, including interactive input devices, such as keyboards, and display devices and graphical user interfaces (GUIs).

In accordance with example embodiments, Clebsch-Gordan CNNs may be used in computer vision tasks and functions that may be part of the operations of various types of devices and systems. Non-limiting examples of such devices and systems include servers in a network, portable or mobile devices such a smartphones or the like, and autonomous vehicles, such as self-driving cars or drones (e.g., aerial, terrestrial, and/or marine drones). As such, example computing systems and/or devices, including ones discussed by example herein, could be part of or embedded in one or more the non-limiting example devices and systems listed above, among others.

Input data defined on a sphere, as discussed herein, may be described or represented as one or more functions defined on a sphere. In such a representation, the input data may be considered to be functional values (or functional evaluations) of the one or more functions at specific points or locations on a sphere. For example, red, green, and blue channels of an imaging device, such as a digital camera, could be represented by three functions, one for each channel. The input data could then be pixel values for each channel, which then correspond to evaluations of each of the three functions at specified pixel locations. For functions on a sphere, the pixel locations might thus be on a spherical image surface. Note that the original source of the data—e.g., a digital imaging device—may not necessarily acquire the data on a spherical imaging plane. For example, a 360° image might be approximated from multiple flat-plane images acquired along multiple line-of-sight directions from a common observation point. The input data may then be the projection of the pixel-image data on a sphere, such that the points of functional evaluation on the sphere correspond to the projections of the image-plane pixels of the multiple images on the sphere.

FIG. 1 is an example, conceptual illustration of a projection of a planar image 104 (or data) onto the surface of a sphere 102. In the illustration, the planar image 104 lies in a spatial plane 100 above the sphere 102. Two perpendicular, broad arrows in the plane 100 represent possible translation displacements in the plane 100, and the broad, curved arrow in the plane 100 represent possible rotational displacements in the plane 100. Downward arrow pointing from the planar image 104 to the sphere 102 represent the projection of the image 104 onto the surface of the sphere 102, where the projected image is also shown. The broad, curved arrows 106, 108, and 110 represent spatial rotations on the spherical surface corresponding to the translations and rotations of the image 104 in the plane 100.

Other forms of input data are possible as well. For example, input data at given points on a sphere could correspond to vector values or vector functions. Such forms could be used to represent optical flow, for example. It should also be understood that the functions defined on a sphere, as discussed herein could be real or complex (i.e., have real and imaginary components).

While example embodiments herein are described in terms of computer vision tasks such as object recognition, Clebsch-Gordan CNNs may be used in other tasks as well. Non-limiting examples include object recognition in volumetric images, such as computer tomography (CT) or magnetic resonance imaging (MRI) scans and/or images.

II. Example Computing Devices and Computing Systems

Example methods may be implemented as machine language instructions stored one or another forms of the media storage, and accessible by the one or more processors of a computing device or computing system, and that, when executed by the one or more processors cause the computing device and/or system to carry out the various operations and functions of the methods described herein.

Figure 2:
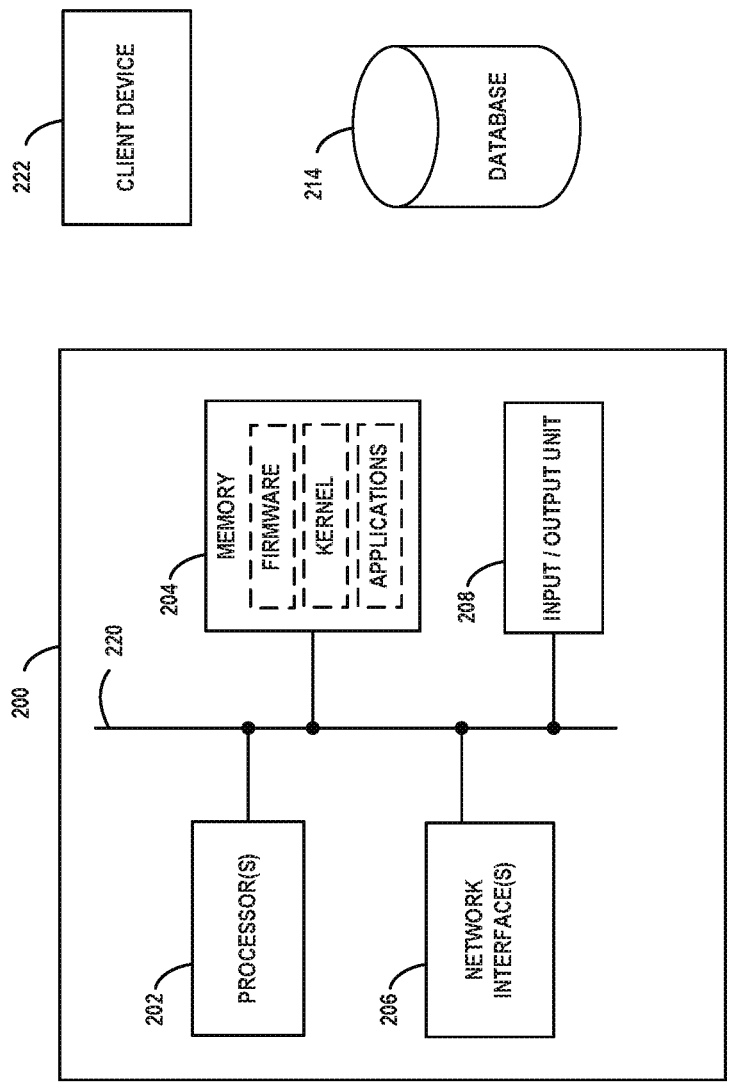
FIG. 2 depicts a simplified block diagram of an example computing device, in accordance with example embodiments.

FIG. 2 is a simplified block diagram of an example computing device 200, according to example embodiments. As shown, the computing system 200 includes processor(s) 202, memory 204, network interface(s) 206, and an input/output unit 208. By way of example, the components are communicatively connected by a bus 220. The bus could also provide power from a power supply (not shown).

Also by way of example, the memory 204 may include firmware, a kernel, and applications, among other forms and functions of memory. As described, the memory 204 may store machine-language instructions, such as programming code, that may be executed by the processor(s) 202 in order to carry out operations that implement the methods and techniques described herein.

The network interface(s) 206 may provide network connectivity to the computing system 200, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

Network interface(s) 206 may provide network connectivity to the computing system 100, such as to the internet or other public and/or private networks. Networks may be used to connect the computing system 200 with one or more other computing devices, such as servers or other computing systems. In an example embodiment, multiple computing systems could be communicatively connected, and example methods could be implemented in a distributed fashion.

FIG. 2 also includes a client device 222 and a database 214. The client device may be a user client or terminal that includes an interactive display, such as a GUI. It may be used for user access to programs, applications, and data of the system 200. For example, a GUI could be used for graphical interaction with programs and applications described herein.

The database 214 could include input data, such as images. Data could be acquired for processing and/or recognition by a neural network, including a Clebsch-Gordan CNN. The data could additionally or alternatively be training data that may be input to a Clebsch-Gordan CNN for training, such as determination of weighting factors applied at various layers of the CNN. The database 214 could be used for other purposes as well.

III. Clebsch-Gordan Convolutional Neural Networks

1. Convolutions on the Sphere

A fairly simple example of a covariant neural network is a classical S+1 layer CNN for image recognition. In each layer of a CNN the neurons may be arranged in a rectangular grid, so (assuming for simplicity that the network has just one channel) the activation of layer s can be regarded as a function $f^s: \mathbb{Z}^2 \to \mathbb{R}$, with $f^0$ being the input image. The neurons compute $f^s$ by taking the cross-correlation of the previous layer's output with a small (learnable) filter $h^s$, $$(h^s * f^{s-1})(x) = \Sigma_y h^s(y-x) f^{s-1}(y). \quad (1)$$

and then applying a nonlinearity σ, such as the Re-LU operator:

$$f^s(x) = \sigma((h^s * f^{s-1})(x)). \quad (2)$$

Defining $T_x(h)(y) = h^s(y-x)$, which is nothing but $h^s$ translated by x, allows equation (1) to be rewritten as $$h^s * f^{s-1}(x) = \langle f^{s-1}, T_x(h^s) \rangle, \quad (3)$$

where the inner product is $\langle f^{s-1}, T_x(h^s) \rangle = \Sigma_y f^{s-1}(y) T_x(h^s)(y))$. This formula indicates that each layer of the CNN just does pattern matching. That is, $f^s(x)$ is an indication of how well the part of $f^{s-1}$ around x matches the filter $h^s$.

Equation (3) is the natural starting point for generalizing convolution to the unit sphere, $S^2$. An immediate complication, however, is that unlike the plane, $S^2$ cannot be discretized by any regular (by which we mean rotation invariant) arrangement of points. In the following, each $f^s$ and the corresponding filter $h^s$ is treated as continuous functions on the sphere, $f^s(\theta,\phi)$ and $h^s(\theta,\phi)$, where θ and φ are the polar and azimuthal angles. For reasons explained below, both these functions may be complex valued.

The inner product of two complex valued functions on the surface of the sphere is given by the formula $$\langle g, h \rangle_{S_2} = \frac{1}{4\pi} \int_0^{2\pi} \int_{-\pi}^{\pi} [g(\theta, \phi)]^* h(\theta, \phi) \cos(\theta) d\theta d\phi \quad (4)$$

where * denotes complex conjugation. Further, h (dropping the layer index for clarity) can be moved to any point $(\theta_0, \phi_0)$ on $S^2$ by taking $h'(\theta,\phi)=(\theta-\theta_0,\phi-\phi_0)$. This suggests that the generalization of equation (3) the sphere might be expressed as $$(h \star f)(\theta, \phi) = \frac{1}{4\pi} \int_0^{2\pi} \int_{-\pi}^{\pi} [h(\theta - \theta_0, \phi - \phi_0)]^* f(\theta, \phi) \cos(\theta) d\theta d\phi. \quad (5)$$

However, this generalization would be wrong, because it does not take into account that h can also be rotated around a third axis. Instead, the correct way to generalize cross-correlations to the sphere is to define $h \star f$ as a function on the rotation group itself, i.e., to set $$(h \star f)(R) = \frac{1}{4\pi} \int_0^{2\pi} \int_{-\pi}^{\pi} [h_R(\theta, \phi)]^* f(\theta, \phi) \cos(\theta) d\theta d\phi \quad (6)$$

$$R \in SO(3)$$

where $h_R$ is h rotated by R, expressible as $$h_R(x) = h(R^{-1}x), \quad (7)$$

with x being the point on the sphere at position (θ,φ).

1.1. Fourier Space Filters and Activations

It has previously been observed that the double integral in equation (6) would be extremely inconvenient to compute in a neural network. As mentioned, in the case of the sphere, just finding the right discretizations to represent $f$ and h is already problematic. As an alternative, it is natural to represent both these functions in terms of their spherical harmonic expansions $$f(\theta, \phi) = \sum_{\ell=0}^{\infty} \sum_{m=-\ell}^{\ell} \hat{f}_\ell^m Y_\ell^m(\theta, \phi) \quad (8)$$

$$h(\theta, \phi) = \sum_{\ell=0}^{\infty} \sum_{m=-\ell}^{\ell} \hat{h}_\ell^m Y_\ell^m(\theta, \phi)$$

Here, $Y_l^m(\theta,\phi)$ are the well known spherical harmonic functions indexed by l=0, 1, 2, . . . and m∈ {−l, −l+1, . . . , l}. The spherical harmonics form an orthonormal basis for $L_2(S^2)$, so equation (8) can be seen as a kind of Fourier series on the sphere, in particular, the elements of the $f_0$, $f_1$, $f_2$, . . . coefficient vectors can be computed relatively easily by $$\hat{f}_\ell^m = \frac{1}{4\pi} \int_0^{2\pi} \int_{-\pi}^{\pi} f(\theta, \phi) Y_\ell^m(\theta, \phi) \cos(\theta) d\theta d\phi,$$

and similarly for h. Similarly to usual Fourier series, in practical scenarios spherical harmonic expansions are computed up to some limiting "frequency" L, which depends on the desired resolution.

From noncommutative harmonic analysis, it is known that functions on the rotation group also admit a type of generalized Fourier transform. Given a function g: SO(3)→ℂ , the Fourier transform of g is defined as the collection of matrices $$G_\ell \frac{1}{4\pi} \int_{SO(3)} g(R) \rho_\ell(R) d\mu(R) \quad \ell = 0, 1, 2, \ldots , \quad (9)$$

where $\rho_l: SO(3) \to \mathbb{C}^{(2l+1)\times(2l+1)}$ are fixed matrix valued functions called the irreducible representations of SO(3), sometimes also called Wigner D-matrices. Here μ is a fixed measure called the Haar measure that just hides factors similar to the cos θ appearing in equation (4). It may be noted that one dimensional irreducible representation $\rho_0$ is the constant representation $\rho_0(R)=(1)$. % iv Fourier transform is given by $$g(R) = \sum_{\ell=0}^{\infty} tr[G_\ell \rho_\ell(R^{-1})] \quad R \in SO(3)$$

While the spherical harmonics can be chosen to be real, the $\Sigma_l(R)$ representation matrices are inherently complex valued. This is the reason that all other quantities, including the $f^s$ activations and $h^s$ filters are allowed to be complex, too.

It is noteworthy that the above notions of harmonic analysis on the sphere and the rotation group are closely related. In particular, it is possible to show that each Fourier component of the spherical cross correlation represented in equation (6) that is of interest to be computed is given simply by outer product $$[\widehat{h*f}]_l = \hat{f}_l \hat{h}_l^\dagger \quad l=0,1,2,\ldots,L, \quad (10)$$

where † denotes the conjugate transpose (Hermitian conjugate) operation. An approach taken in previous research in spherical CNNs is that instead of the continuous function $f$, it is more expedient to regard the components of the $\hat{f}_0$, $\hat{f}_0, \ldots, \hat{f}_L$ vectors as the "activations" of their neural network, while the learnable weights or filters are the $\hat{h}_0$, $\hat{h}_1, \ldots, \hat{h}_L$ vectors. Computing spherical convolutions in Fourier space then reduces to just computing a few outer products. Layers s=2, 3, . . . , S of the Spherical CNN operate similarly, except that $f^{s-1}$ is a function on SO(3), so equation (6) must be replaced by cross-correlation on SO(3) itself, and h must also be a function on SO(3) rather than just the sphere. Fortuitously, the resulting cross-correlation formula is almost exactly the same:

$$[\widehat{h*f}]_l = F_l H_l^\dagger \quad l=0,1,2,\ldots,L, \quad (11)$$

apart from the fact that now $F_l$ and $H_l$ are matrices.

2. Generalized Spherical CNNs

In accordance with example embodiments, the starting point for our Generalized Spherical CNNs is the Fourier space correlation equation (10). In contrast to previous research in spherical CNNs, however, rather than the geometry, the approach taken herein focuses on its algebraic properties, in particular, its behavior under rotations. It is well known that if a spherical function is rotated by some R∈ SO(3) as in equation (7), then each vector of its spherical harmonic expansion just gets multiplied with the corresponding Wigner D-matrix:

$$\hat{f}_l \mapsto \rho_l(R) \cdot \hat{f}_l. \quad (12)$$

For functions on SO(3), the situation is similar. If g: SO(3)→$\mathbb{C}$ and g' is the rotated function g'(R')=g(R$^{-1}$R') then the Fourier matrices of g' are G'$_l$=ρ$_l$(R)G$_l$. The following proposition shows that the matrices output by the cross-correlation formulae of equations (10) and (11) behave analogously:

Proposition 1 Let $f$: $S^2$→$\mathbb{C}$ be an activation function that under the action of a rotation R transforms as equation (7), and let h: $S^2$→$\mathbb{C}$ be a filter. Then, each Fourier component of the cross correlation equation (6) transforms as $$[\widehat{h*f}]_l \mapsto \rho_l(R) \cdot \widehat{h*f}_l \quad (13)$$

Similarly, if $f'$, h': SO(3)$\mapsto \mathbb{C}$ then, $\widehat{h'*f'}$ (as defined in equation (11) transforms the same way.

Equation (12) describes the behavior of spherical harmonic vectors under rotations, while equation (15) describes the behavior of Fourier matrices. However, the latter is equivalent to saying that each column of the matrices separately transforms according to equation (12). One of the main concepts of the present disclosure is to take this property as the basis for the definition of covariance to rotations in neural nets. This may be captured by following definition.

Definition 1 Let N be an S+1 layer feed-forward neural network whose input is a spherical function $f^0$:

$S^2$→$\mathbb{C}^d$. Then. N is said to be a generalized SO(3)-covariant spherical CNN if the output of each laver s can be expressed as a collector of vectors $$\hat{f}^s = \Big(\underbrace{\hat{f}^s_{0,1}, \hat{f}^s_{0,2}, \ldots, \hat{f}^s_{0,\tau_0^s}}_{\ell=0}, \underbrace{\hat{f}^s_{1,1}, \hat{f}^s_{1,2}, \ldots, \hat{f}^s_{1,\tau_1^s}}_{\ell=1}, \ldots, \underbrace{\ldots \hat{f}^s_{L,\tau_L^s}}_{\ell=L}\Big) \quad (14)$$

where each $\hat{f}^s_{l,j} \in \mathbb{C}^{2l+1}$ is a $\rho_l$-covariant vector in the sense that if the input image is rorated by some rotation R then $\hat{f}^s_{l,j}$ transforms as $$\hat{f}^s_{l,j} \to \rho_l(R) \cdot \hat{f}^s_{l,j}. \quad (15)$$

Herein, the individual $\hat{f}^s_{l,j}$ vectors are called the irreducible fragments of $\hat{f}^s$, and the integer vector $\tau^s = (\tau_0^s, \tau_1^s, \ldots, \tau_L^s)$ counting the number of fragments for each l the type of $\hat{f}^s$.

There are a few things worth noting about Definition 1. First, since the maps expressed in equation (15) are linear, any SO(3)-covariant spherical CNN is equivariant to rotations, as defined in the above. Second, regarding previous research in spherical CNNs, since the inputs are functions on the sphere, whereas in higher layers the activations are functions on SO(3), the previous architecture is a special case of Definition 1 with $\tau^0$=(1, 1, . . . , 1) and $\tau^s$=(1, 3, 5, . . . , 2L+1) for s≥1.

Finally, by the theorem of complete reducibility of representations of compact groups, any $f^s$ that transforms under rotations linearly is reducible into a sequence of irreducible fragments as in equation (14). This means that equation (14) is really the most general possible form for an SO(3) equivariant neural network. As noted above, technically, the terms "equivariant" and "covariant" map to the same concept. The difference between them is one of emphasis. The term "equivariant" may be used when the same group is acting on two objects in a way that is qualitatively similar, as in the case of the rotation group acting on functions on the sphere and on cross-correlation functions on SO(3). The term "covariant" may be used if the actions are qualitatively different, as in the case of rotations of functions on the sphere and the corresponding transformations of equation (15) of the irreducible fragments in a neural network.

To fully define the neural network in accordance with the present disclosure, three things are needed: 1. The form of the linear transformations in each layer involving learnable weights, 2. The form of the nonlinearity in each layer, 3. The way that the final output of the network can be reduced to a vector that is rotation invariant, since that is an ultimate goal. The following subsections describe each of these components in turn.

2.1 Covariant Linear Transformations

In a covariant neural network architecture, the linear operation of each layer must be covariant. As described above, in classical CNNs, convolution automatically satisfies this criterion. Recent research has considered the more general setting of covariance to the action of compact groups. Specializing the recent results to the cases considered herein leads to the following.

Proposition 2 Let $\hat{f}^s$ be an SO(3)-covariant activation function of the form given by equation (14), and $\hat{g}^s = \mathcal{L}(\hat{f}^s)$ be a linear function of $\hat{f}^s$ written in a similar form. Then $\hat{g}^2$ is SO(3)-covariant if and only each $\hat{g}^s_{l,j}$ fragment is a linear combination of fragments from $\hat{f}^s$ with the same l.

Proposition 2 can be rephrased by stacking all fragments of $\hat{f}$ corresponding to $l$ into a $(2l+1)\times\Sigma_l^s$ dimensional matrix $\hat{f}_l^s$, and doing the same for $\hat{g}$. Then the proposition states that $$G_l^s = F_l^s W_l^s \quad l=0,1,2,\ldots,L \quad (16)$$

for some sequence of complex valued matrices $W_0^s, \ldots, W_L^s$. Note that $W_l^s$ does not necessarily need to be square, i.e., the number of fragments in $\hat{f}$ and $\hat{g}$ corresponding to $l$ might be different. In the context of a neural network, the entries of the $W_l^s$ matrices are learnable parameters.

Note that the Fourier space cross-correlation formulae of equations (10) and (11) are special cases of equation (16) corresponding to taking $W_l = \hat{h}_l^\dagger$ or $W_l = H_l^\dagger$. The case of general $W_l$ does not have such an intuitive interpretation in terms of cross-correlation. What equation (16) may lack in terms of straightforward interpretability it makes up for in terms of generality, since it provides an extremely simple and flexible way of inducing SO(3)-covariant linear transformations in neural networks.

2.2 Covariant Nonlinearities: The Clebsch-Gordan Transform

Differentiable nonlinearities are essential for the operation of multi-layer neural networks. Formulating covariant nonlinearities in Fourier space, however, is more mathematically challenging than formulating the linear operation. For this reason, most existing group equivariant neural networks perform this operation in "real space." However, as discussed above, moving back and forth between real space and the Fourier domain comes at a significant cost, and leads to a range of complications involving quadrature on the transformation group and numerical errors.

In accordance with example embodiments, a fully Fourier space nonlinearity may be devised based on the Clebsch-Gordan transform. More specifically, in representation theory, the Clebsch-Gordan decomposition arises in the context of decomposing the tensor (i.e., Kronecker) product of irreducible representations into a direct sum of irreducibles. In the specific case of SO(3), it takes form $$\rho_{l_1}(R) \otimes \rho_{l_2}(R) = C_{l_1,l_2} [\otimes_{l=|l_1-l_2|}^{l_1+l_2} \rho_l] C_{l_1,l_2}^T \quad R \in SO(3)$$

where $C_{l_1,l_2}$ are fixed matrices. Equivalently, letting $C_{l_1,l_2,l}$ denote the appropriate block of columns $C_{l_1,l_2}$ $$\rho_l(R) = C_{l_1,l_2,l}^T [\rho_{l_1}(R) \otimes \rho_{l_2}(R)] C_{l_1,l_2,l}.$$

The CG-transform is well known in physics, because it is intimately related to the algebra of angular momentum in quantum mechanics, and the entries of the $C_{l_1,l_2,l}$ matrices can be computed relatively easily. The following Lemma explains why this construction is relevant to creating Fourier space nonlinearities.

Lemma 3 Let $\hat{f}_{l_1}$ and $\hat{f}_{l_2}$ be two $\rho_{l_1}$ resp. $\rho_{l_2}$ covariant vectors, and $l$ be any integer between $|l_1-l_2|$ and $l_1+l_2$. Then $$\hat{g}_l = C_{l_1,l_2}^T [\hat{f}_{l_1} \otimes \hat{f}_{l_2}] \quad (17)$$

is a $\rho_{l\text{-covariant vector}}$.

Exploiting Lemma 3, the nonlinearity used in the present generalized Spherical CNNs consists of computing equation (17) between all pairs of fragments. In matrix notation, $$G_l^s = \|_{|l_1-l_2| \leq l \leq l_1+l_2} C_{l_1,l_2,l}^T [F_{l_1}^s \otimes F_{l_2}^s], \quad (18)$$

where $\|$ denotes merging matrices horizontally. Note that this operation increases the size of the activation substantially: the total number of fragments is squared, which can potentially be problematic, and is addressed below.

While the Clebsch-Gordan decomposition has been included in some recent discussions of neural networks for learning physical systems, it has not previously been considered in the present context of a general purpose nonlinearity. At first sight, the computational cost of equation (17) (assuming that $C_{l_1,l_2,l}$ has been precomputed) appears to be $(2l_1+1)(2l_2+1)(2l+1)$. However, $C_{l_1,l_2,l}$ is actually sparse, in particular $[C_{l_1,l_2,l}]_{(m_1,m_2),m} = 0$ unless $m_1+m_2=m$. Denoting the total number of scalar entries in the $F_{l,l}^s$ matrices by N, this reduces the complexity of computing equation (18) to $O(N^2L)$.

Example embodiments of the CG transform as a differentiable operator in a deep learning software framework may be implemented as a C++ PyTorch extension. Other implementations may be possible as well.

A more unusual feature of the CG nonlinearity is its essentially quadratic nature. Quadratic nonlinearities are not commonly used in deep neural networks. Nonetheless, testing of example implementations according to example embodiments indicate that the CG nonlinearity is effective in the context of learning spherical images. It is also possible to use higher CG powers, a tradeoff being increased computational cost.

2.3 Limiting the Number of Channels

In a covariant network, each individual $\widehat{f_\ell^s}$ fragment is effectively a separate channel. In this sense, the quadratic increase in the number of channels after the CG-transform can be seen as a natural broadening of the network to capture more complicated features. However, allowing the number of channels to increase quadratically in each layer could be expected to impose practical and technical challenges.

Drawing on the results discussed above, and in accordance with example embodiments, the exponential increase in the number of channels may be counteracted by following the CG-transform with another learnable linear transformation that reduces the number of fragments for each $l$ to some fixed maximum number $\vec{\tau}_l$. In fact, this linear transformation can replace the transformation discussed in connection with covariant linear transformations. Whereas in conventional neural networks the linear transformation always precedes the nonlinear operation, Clebsch-Gordan networks as discussed herein advantageously facilitate a design in which each layer performs the CG-transform first, followed by a convolution step as in equation (16). This approach may thus limit the number of fragments.

Figure 3:
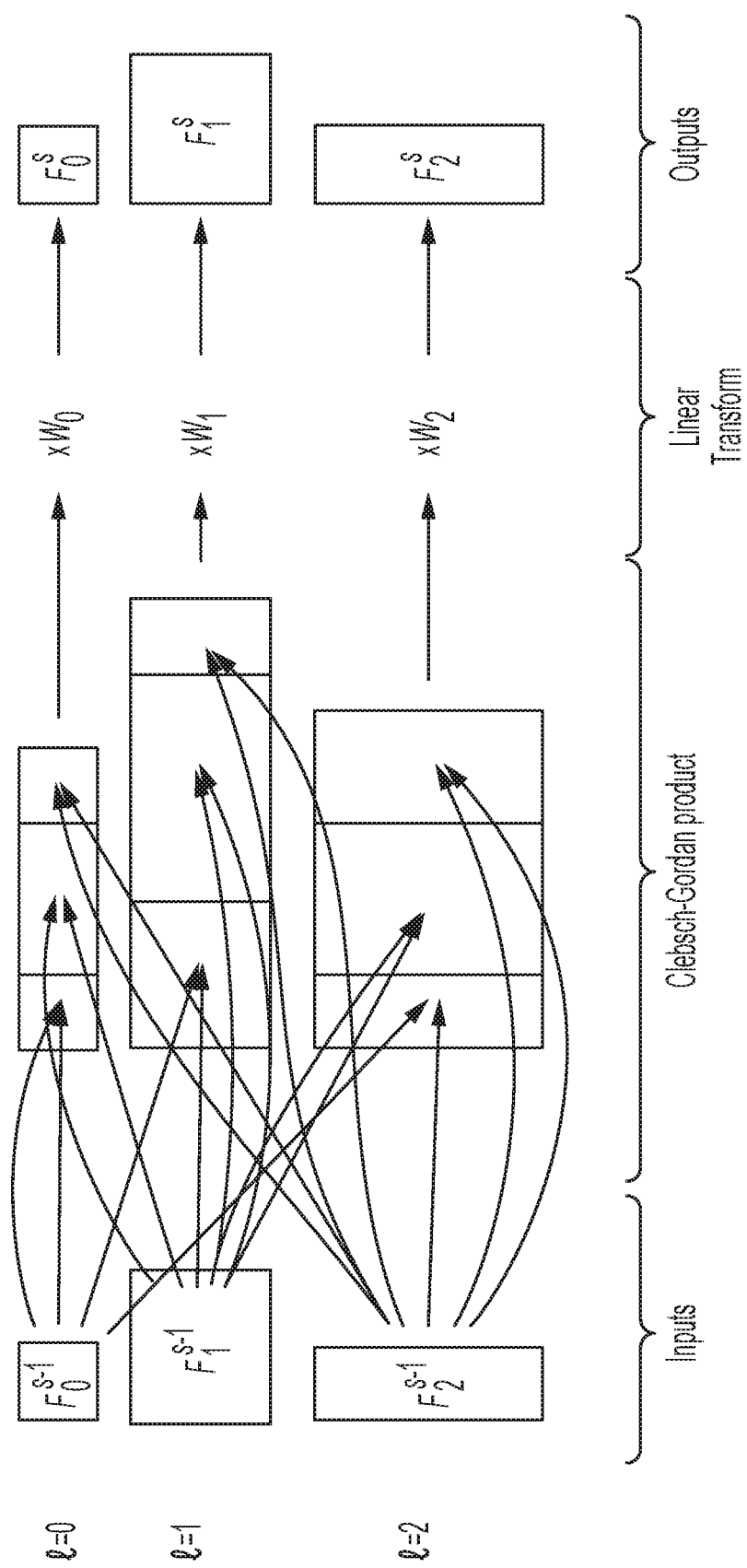
FIG. 3 is a conceptual depiction of computations in one layer of Clebsch-Gordan network, in accordance with example embodiments.

FIG. 3 is a conceptual depiction of computations in one layer of CG network. By way of example, the implementation is band limited to L=2. As shown, activations from layer s–1 are the inputs to the example layer s. The inputs corresponding to l=0, 1, and 2 are used to compute the Clebsche-Gordan products for each channel. The products are multiplied by the respective weighting matrices to produce the activations of layer s, which are then output to the next layer.

2.4 Final Invariant Layer

After the S–1th layer, the activations of the CG network will be a series of matrices $F_0^{S-1}, \ldots, F_L^{S-1}$ each transforming under rotations according to $F_l^{S-1} \mapsto \rho_l(R) F_l^{S-1}$. Ultimately, however, the objective of the network is to output a vector that is invariant with respect rotations, i.e., a collection of scalars. In accordance with the Fourier theoretic language developed herein, this simply corresponds to the $\widehat{f_{0,j}^s}$ fragments, since the l=0 representation is constant, and therefore the elements of $F_0^s$ are invariant. Thus, the final layer can be similar to the earlier ones, except that it only needs to output this single (single row) matrix.

Advantageously, and in contrast to architectures of other recent research in the area of spherical CNN that involve repeated forward and backward transforms, the elements of $F_0^s$ for Clebsch-Gordan nets are guaranteed to be invariant to rotations of arbitrary magnitude not just approximately, but in the exact sense, up to limitations of finite precision arithmetic. This is possible owing to the fully Fourier nature of CG nets, and applies in both training and testing. In accordance with example embodiments, Clebsch-Gonan networks therefore provide significant advantages compared with other covariant architectures.

2.5 Summary of Algorithm

In summary, the Spherical Clebsch-Gordan network described herein is an S+1 layer feed-forward neural network in which apart from the initial spherical harmonic transform, every other operation is a simple matrix operation. An example algorithm for forward pass operation may be described as follows.

The inputs to the network are $n_{in}$ functions $f_1^0, \ldots, f_{n_{in}}^0 : S^2 \to \mathbb{C}$. For example, for spherical color images, $f_1^0, f_2^0$ and $f_3^0$ might encode the red, green and blue channels. For generality, these functions may be considered complex valued, but they may also be real. The activation of layer s=0 is the union of the spherical transforms of these functions $f_1^0, \ldots, f_{n_{in}}^0$ up to some band limit L i.e., $$[\hat{f}_{\ell,j}^0]_m = \frac{1}{4\pi} \int_0^{2\pi} \int_{-\pi}^{\pi} f_j^0(\theta, \phi) Y_\ell^m(\theta, \phi) \cos(\theta) d\theta d\phi. \quad (19)$$

Therefore, the type of $\widehat{f^0}$ is $\tau^0 = (n_{in}, n_{in}, \ldots, n_{in})$ and $\widehat{f^0}$ is stored as a collection of L+1 matrices $\{F_0^0, F_1^0, \ldots, F_L^0\}$ of sizes $1 \times n_{in}, 3 \times n_{in}, 5 \times n_{in}$.

For layers s=1, 2, ..., S−1, the Fourier space activation $\widehat{f^s} = (F_0^s, F_1^s, \ldots, F_L^s)$ is computed as follows:

(a) Form all possible Kronecker products.

$$G_{l_1,l_2}^s = F_{l_1}^{s-1} \otimes F_{l_2}^{s-1} \quad 0 \leq l_1 \leq l_2 \leq L \quad (20)$$

Note that the size of $G_{l_1,l_2}^s$ is $(2l+1)(2+1) \times (\tau_{l_1}^{s-1} \tau_{l_2}^{s-1})$.

(b) Each $G_{l_1,l_2}^s$ is decomposed into variant blocks by $$[G_{l_1,l_2}^s]_l = C_{l_1,l_2,l}^\dagger G_{l_1,l_2}^s \quad (21)$$

where $C_{l_1,l_2}^\dagger$ is the inverse Clebsch-Gordan matrix as equation (17).

(c) All $[G_{l_1,l_2}^s]_l$ blocks with the same l are concatenated into a large matrix $H_l^s \in \mathbb{C}^{2(l+1) \times \tau_l^s}$ and this is multiplied by the weight matrix $W_l^s \in \mathbb{C}^{\tau_l^s \times \tau_l^s}$ to give $$F_l^s = H_l^s W_l^s \quad l = 0, 1, \ldots, L \quad (22)$$

The operation of layer S is similar, except that the output type is $\tau^S = (n_{out}, 0, 0, \ldots, 0)$, so components with l>0 do not need to be computed. By construction, the entries of $F_0^s \in \mathbb{C}^{1 \times n_{out}}$ are SO(3)-invariant scalars, i.e., they are invariant to the simultaneous rotation of the $f_1^0, f_2^0, \ldots, f_{n_{in}}^0$ inputs. These scalars may be passed on to a fully connected network or plugged directly into a loss function.

The learnable parameters of the network are the $\{W_l^s\}_{s,l}$ weight matrices. The matrices are initialized with random complex entries. The network may be trained by backpropagating the gradient of the loss from layer S to each of the weight matrices. More specifically, the Clebsch-Gordan CNN may be trained by backpropagation, in which the derivative of an error from the last layer of the network is backpropagated through all the Clebsch-Gordan transforms and all the matrix multiplications to compute the gradient with respect to every entry of every weight matrix. The weight matrices may then be updated using this gradient with one or another of known algorithms. Non-limiting examples of such algorithms include "Adam" and "Ada-Grad." Custom algorithms could be developed for this purpose as well.

Figure 4:
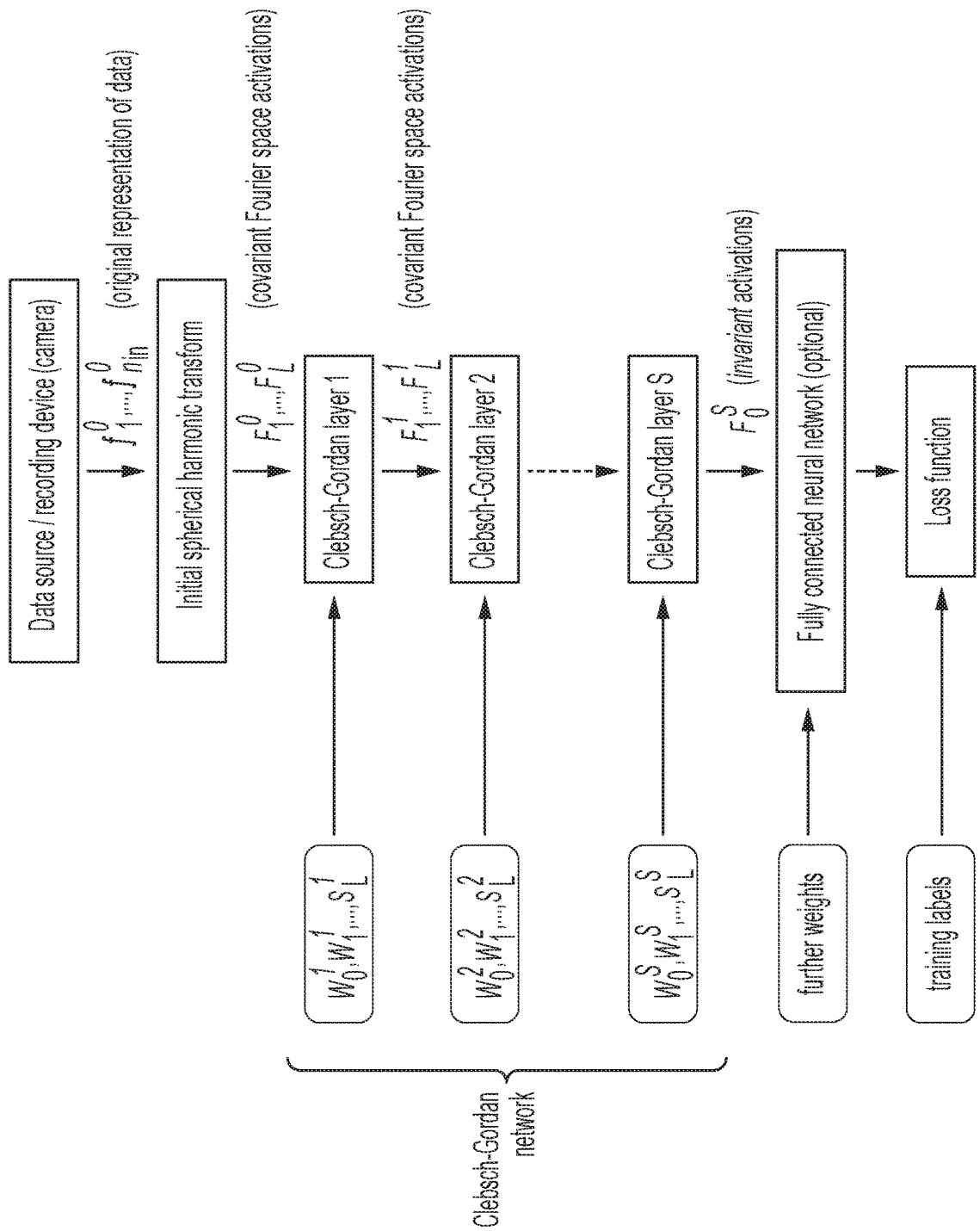
FIG. 4 illustrates analytical flow of layers of a spherical convolutional neural network, in accordance with example embodiments.

FIG. 4 illustrates analytical flow of layers of a spherical convolutional neural network, in accordance with example embodiments. As indicated, the initial data, such digital image data, are input in the form of evaluations of spherical functions, $f_1^1, \ldots, f_{n_{in}}^0$, on the surface of a sphere. The input layer transform is applied to inputs to expand them in terms of spherical harmonics, yielding covariant Fourier space activation $F_1^0, \ldots, F_L^0$ as outputs. These are processed sequentially through intermediate Clebsche-Gordan layers of the spherical CNN to generate each layer's Fourier space activation $F_1^1, \ldots, F_L^1, F_1^2, \ldots, F_L^2, \ldots$ outputs. The final layer generate the invariant activations $F_s^0$. These may then be fed into a full connected neural network for further processing.

2.6 Extension of Spherical CNNs to Volumetric Convolution

The CG-net spherical CNNs described above are directed to a two-dimensional (2D) case. Non-limiting example embodiments of equivariance to rotations include various applications to 2D image recognition. As mentioned above, equivariance to rotations applies to three-dimensional (3D), or volumetric, images. Non-limiting examples include MRI and CT (or CAT) scans, for which equivariance to rotations may be of particular importance. For example, the ability to recognize a given anatomical feature or pathology should be not depend on the 3D orientation of the (3D) image.

Translations and rotations in 3D together form the so-called special Euclidean group SE(3). Ideally, a neural network for object recognition, classification, detection or segmentation in volumetric images would be fully equivarient to the action of this group. However, certain features of this group, chiefly that it is not compact, make this task difficult. Recent research in this area has proposed a network that is approximately SE(3)-equivariant, but it is not clear whether the proposal is computationally feasible. The recent research, as well as that connected with the present disclosure, makes use of the notion of steerability, which allows separating the translational and rotational part of the SE(3) action.

The inventors have recognized that designing rotation equivariant (i.e., SO(3) equivariant) volumetric CNNs is a desirable goal. The Spherical CNN described above achieves SO(3) equivariance for a single spherical shell by extending functions on the sphere in terms of the irreducible representations of SO(3) and consistently applying only two types of operations:

1) Tensor products of vectors corresponding to different irreducible representations, followed by a Clebsch-Gordan decomposition;
2) Linear mixing of vectors corresponding to the same irreducible representation.

In accordance with example embodiments, extending this framework to volumetric images entails taking the spherical Fourier transform of the input image $f(r, \theta, \phi)$ in terms of some appropriate chosen set $\{\psi_i(r)\}_{i=1}^N$ of radial basis functions:

$$\hat{f}_{\ell,i}^m = \frac{1}{4\pi} \int_0^{2\pi} \int_{-\pi}^{\pi} f(\theta, \phi, r) \psi_i(r) Y_\ell^m(\theta, \phi) \cos(\theta) d\theta d\phi dr. \quad (23)$$

Note the appearance of the extra i index of $\hat{f}_{l,i}{}^{m}$. Once these $\hat{f}_{l,i}{}^{m}$ vectors have been computed, they can be CG-multiplied in just the same way as described above for the two-dimensional (spherical surface) case, while maintaining equivariance.

The difference is that for steerability, these vectors must be computed relative to not just one center, but by placing the center of the spherical coordinate system at each grid point of a 3D grid spanning the volumetric image. Later, mixing vectors at different gridpoints can become computationally tricky. However, for tasks such as image segmentation may not even be necessary. All that the neural network needs to learn is, for example, what constitutes the boundary of a given type of object, which can be handled locally, with separate Spherical/radial CNNs at each grid point.

IV. Example Test Results

This section describes results of example tests carried out in the form of numerical, programming-based experiments. In particular, the test results are compared with results from previous research in spherical CNNs reported in a paper entitled "Spherical CNNs" by Cohen et al. published 2018 in *International Conference on Learning Representations*. Comparison with Cohen et al may be useful, because the Spherical CNN proposed in Cohen et al may be considered as aiming at similar challenges to those addressed by the analytical approach developed herein. The comparison may also be instructive for two different reasons: Firstly, while the procedure used in Cohen et al. is exactly equivariant in the discrete case, for the continuous case Cohen et al. uses a discretization which causes the proposed network to partially lose equivariance with changing bandwidth and depth. In contrast, the CG-net approach described herein is always equivariant in the exact sense. Secondly, owing to the nature of the architecture and discretization devised in Cohen et al, that approach uses a more traditional non-linearity, i.e. the ReLU. In contrast, the CG-net approach, in order to maintain full covariance and to avoid the quadrature, uses an unconventional quadratic non-linearity in Fourier space. In view of these two differences, the experiments may demonstrate the advantages of avoiding the quadrature and maintaining full equivariance despite using a purportedly weaker nonlinearity.

1. Rotated MNIST on the Sphere

A version of MNIST was used in the experiments, in which the images are painted onto a sphere and two instances, as in Cohen et al., were used: one in which the digits are projected onto the northern hemisphere and another in which the digits are projected on the sphere and are also randomly rotated.

The baseline model was a classical CNN with 5×5 filters and 32, 64, 10 channels with a stride of 3 in each layer (roughly 68K parameters). This CNN is trained by mapping the digits from the sphere back onto the plane, resulting in nonlinear distortions. The second model used in the comparison is the Spherical CNN proposed in Cohen et al. For this method, the same architecture as reported by Cohen et al was used; i.e., having layers S2 convolution—ReLU— SO(3) convolution—ReLU—Fully connected layer with bandwidths 30, 10 and 6, and the number of channels being 20, 40 and 10 (resulting in a total of 58K parameters).

The following architecture was used in the CG-net approach to the experiments: A bandlimit was set according $L_{max}=10$, while keeping $$\tau_l = \frac{12}{\sqrt{2l+1}},$$

and using a total of 5 layers as described above, followed by a fully connected layer of size 256 by 10. A variant of batch normalization was used that preserves covariance in the Fourier layers. This method takes an expanding average of the standard deviation for a particular fragment for all examples seen during training until then and divide the fragment by it (in testing, use the average from training); the parameter corresponding to the mean in usual batch normalization is kept to be zero as anything else will break covariance. Finally, the output of each $F_0{}^s$ was concatenated in each internal layer (length 24 each, as each is $\tau_0=12$ complex numbers), as well as the original coefficient at l=0 (length 2), into a SO(3) invariant vector of length 122. (It may be observed that having these skip connections helped facilitate smooth training.) After that, we use a known batch normalization on the concatenated results before feeding it into fully connected layers of length 256, a dropout layer with dropout probability 0.5, and finally a linear layer to 10 output nodes. The total number of parameters was 285,772, the network was trained by using a known ADAM optimization procedure with a batch size of 100 and a learning rate of 5×10-4. An $L_2$ weight decay of 1×10-5 was also used on the trainable parameters.

Three sets of experiments are presented in Table 1: For the first set both the training and test sets were not rotated (denoted NR/NR), for the second, the training set was not rotated while the test was randomly rotated (NR/R) and finally when both the training and test sets were rotated (denoted R/R). The CG-net method is denoted "FFS2CNN."

TABLE 1

| Method | NR/NR | NR/R | R/R |
| --- | --- | --- | --- |
| Baseline CNN | 97.67 | 22.18 | 12 |
| Cohen et al. | 95.59 | 94.62 | 93.4 |
| FFS2CNN | 96.4 | 96 | 96.6 |

It may be observed that the baseline model's performance deteriorates in the three cases, more or less reducing to random chance in the R/R case. While FFS2CNN results are better than those reported in Cohen et al., they also have another characteristic: they remain roughly the same in the three regimes, while those of Cohen et al. slightly worsen. A reason for this might be a result of the loss of equivariance in the method of Cohen et al.

2. Atomization Energy Prediction

The CG-net framework was applied to the QM7 dataset described in two papers: L. C. Blum and J.-L. Reymond, "970 million druglike small molecules for virtual screening in the chemical universe database gdb-13," *Journal of the American Chemical Society*, 2009 (Blum et al.); and M. Rupp, A. Tkatchenko, K.-R. Müller, and O. A. von Lilienfeld, "Fast and accurate modeling of molecular atomization energies with machine learning," *Physical Review Letters*. 2012 (Rupp et al). The goal in these papers is to regress over atomization energies of molecules given atomic positions ($p_i$) and charges ($z_i$). Each molecule contains up to 23 atoms of five types (C, N, O, S, H). In the present experiments, the Coulomb Matrix (CM) representation proposed by Rupp et al. was used, which is rotation and translation invariant but not permutation invariant. The Coulomb matrix $C \in R^{N \times N}$ is defined such that for a pair of atoms i≠j, $C_{ij}=(z_i z_j)/(|p_i-p_j|)$, which represents the Coulomb repulsion, and for atoms i=j, $C_{ii}=0.5 z_i{}^{2.4}$, which denotes the atomic energy due to charge. To test the present algorithm the same set up as in Cohen et al. was used. Namely, a sphere $S_i$ was defined around $p_i$ for each atom i. Ensuring uniform radius across atoms and molecules and ensuring no intersections amongst spheres during training, potential functions $$U_z(x) = \sum_{j \neq i, z_j = z} \frac{z_i z}{|x - p_i|}$$

were defined for every z and for every x on $S_i$.

This yielded a T channel spherical signal for each atom in a molecule. This signal is then discretized using a grid as described in the paper J. R. Driscoll and D. M. Healy, "Computing fourier transforms and convolutions on the 2-sphere," *Advances in Applied Mathematics*, 1994 (Driscoll et al.), and using a bandwidth of b=10. This gives a sparse tensor representation of dimension N×T×2b×2b for every molecule.

The CG spherical CNN architecture described herein has the same parameters and hyperparameters as described above, except that $\tau_i$=15 for all layers, increasing the number of parameters to 1.1 M. Following Cohen et al, weights are shared amongst atoms and each molecule is represented as a N×F tensor where F represents scalars concatenated together. Finally, the approach proposed in the paper M. Zaheer, S. Kottur, S. Ravanbakhsh, B. Poczos. R. Salakhutdinov, and A. Smola, "Deep sets," 2017 (Zaheer et al.) was used to ensure permutation invariance. The feature vector for each atom is projected onto 150 dimensions using a MLP. These embeddings are summed over atoms, and then the regression target is trained using another MLP having 50 hidden units. Both of these MLPs are jointly trained. The final results are presented below, which show that the present CG-net method outperforms the Spherical CNN of Cohen et al. The only method that appears to provide better performance is a MLP trained on randomly permuted Coulomb matrices as reported in the paper G. Montavon, K. Hansen, S. Fazli, M. Rupp, F. Biegler, A. Ziehe, A. Tkatchenko, O. A. von Lilienfeld, and K. Müller, "Learning invariant representations of molecules for atomization energy prediction," *NIPS*, 2012 (Montavon et al.). But as Cohen et al. point out, this method is unlikely to scale to large molecules as it needs a large sample of random permutations, which grows rapidly with N. The results are presented in Table 2, which also reference the paper A. Raj, A. Kumar, Y. Mrouch, and P. T. Fletcher et al "Local group invariant representations via orbit embeddings," 2016 (Raj et al.).

TABLE 2

| Method | RMSE |
|---|---|
| MLP/Random CM (Montavon et al.) | 5.96 |
| LGIKA (RF) (Raj et al.) | 10.82 |
| RBF Kernels/Random CM (Montavon et al.) | 11.42 |
| RBF Kernels/Sorted CM (Montavon et al.) | 12.59 |
| MLP/Sorted CM (Montavon et al.) | 16.06 |
| Spherical CNN (Cohen et al.) | 8.47 |
| FFS2CNN | 7.97 |

3. 3D Shape Recognition

Finally, results are presented for shape classification using the SHREC17 dataset described in the paper M. Savva, F. Yu, H. Su, A. Kanezaki, T. Furuya, R. Ohbuchi, Z. Zhou, R. Yu, S. Bai, X. Bai, M. Aono, A. Tatsuma, S. Thermos, A. Axenopoulos, G. Th. Papadopoulos, P. Daras, X. Deng, Z. Lian, B. Li, H. Johan, Y. Lu, and S. Mk, "Large-scale 3d shape retrieval from shapenet core55," *Eurographics Workshop on 3D Object Retrieval*, 2017 (Savva et al.), which is a subset of the larger ShapeNet dataset described in A. X. Chang, T. Funkhouscr, L. Guibas, P. Hanrahan, Q. Huang, Z. Li, S. Savarese, M. Savva, S. Song, H. Su, J. Xiao, L. Yi, and F. Yu, "Shapenet: An information-rich 3d model repository," 2015 (Chang et al.) having roughly 51300 3D models spread over 55 categories. It is divided into a 70/10/20 split for train/validation/test. Two versions of this dataset are available: A regular version in which the objects are consistently aligned and another where the 3D models are perturbed by random rotations. Following Cohen et al, the latter version was used each 3D mesh was represented as a spherical signal by using a ray casting scheme. For each point on the sphere, a ray towards the origin is sent which collects the ray length, cosine and sine of the surface angle. In addition to this, ray casting for the convex hull of the mesh gives additional information, resulting in 6 channels. The spherical signal is discretized using the grid of Driscoll et al. with a bandwidth of 128. The code provided by Cohen et al. was used for generating this representation.

A ResNet style architecture was used, but with the difference that the full input is not fed back but rather different frequency parts of it. With $L_{max}$=14 considered, and a block was trained only until L=8 using $\tau_i$=10 using 3 layers. The next block consists of concatenating the fragments obtained from the previous block and training for two layers until L=10, repeating this process until $L_{max}$ is reached. These later blocks use $\tau_i$=8. As earlier, the scalars from each block were concatenated to form the final output layer, which is connected to 55 nodes forming a fully connected layer. Batch Normalization was used in the final layer, and the normalization discussed above in the Fourier layers. The model was trained with ADAM using a batch size of 100 and a learning rate of 5×10-4, using L2 weight decay of 0.0005 for regularization. The results of the CG-net are compare to some of the known, top performing models on SHREC (which use architectures specialized to the task) as well as the model of Cohen et al. The CG-net method, like the model of Cohen et al. is task agnostic and uses the same representation. Despite this, it is able to consistently come second or third in the competition, showing that it affords an efficient method to learn from spherical signals. The results are presented in Table 3; the first four methods listed are as described in Savva et al.

TABLE 3

| Method | P@N | R@N | F1@N | mAP | NDCG |
|---|---|---|---|---|---|
| Tatsuma_ReVGG | 0.705 | 0.769 | 0.719 | 0.696 | 0.783 |
| Furuya_DLAN | 0.814 | 0.683 | 0.706 | 0.656 | 0.754 |
| SHREC16-Bai_GIFT | 0.678 | 0.667 | 0.661 | 0.607 | 0.735 |
| Deng_CM-VGG5-6DB | 0.412 | 0.706 | 0.472 | 0.524 | 0.624 |
| Spherical CNNs (Cohen et al.) | 0.701 | 0.711 | 0.699 | 0.676 | 0.756 |
| FFS2CNNs | 0.707 | 0.722 | 0.701 | 0.683 | 0.756 |

V. Example Methods

Example methods may be implemented as machine language instructions stored one or another form of the computer-readable storage, and accessible by the one or more processors of a computing device and/or system, and that, when executed by the one or more processors cause the computing device and/or system to carry out the various operations and functions of the methods described herein. By way of example, storage for instructions may include a non-transitory computer readable medium. In example operation, the stored instructions may be made accessible to one or more processors of a computing device or system. Execution of the instructions by the one or more processors may then cause the computing device or system to carry various operations of the example method.

Figure 5:
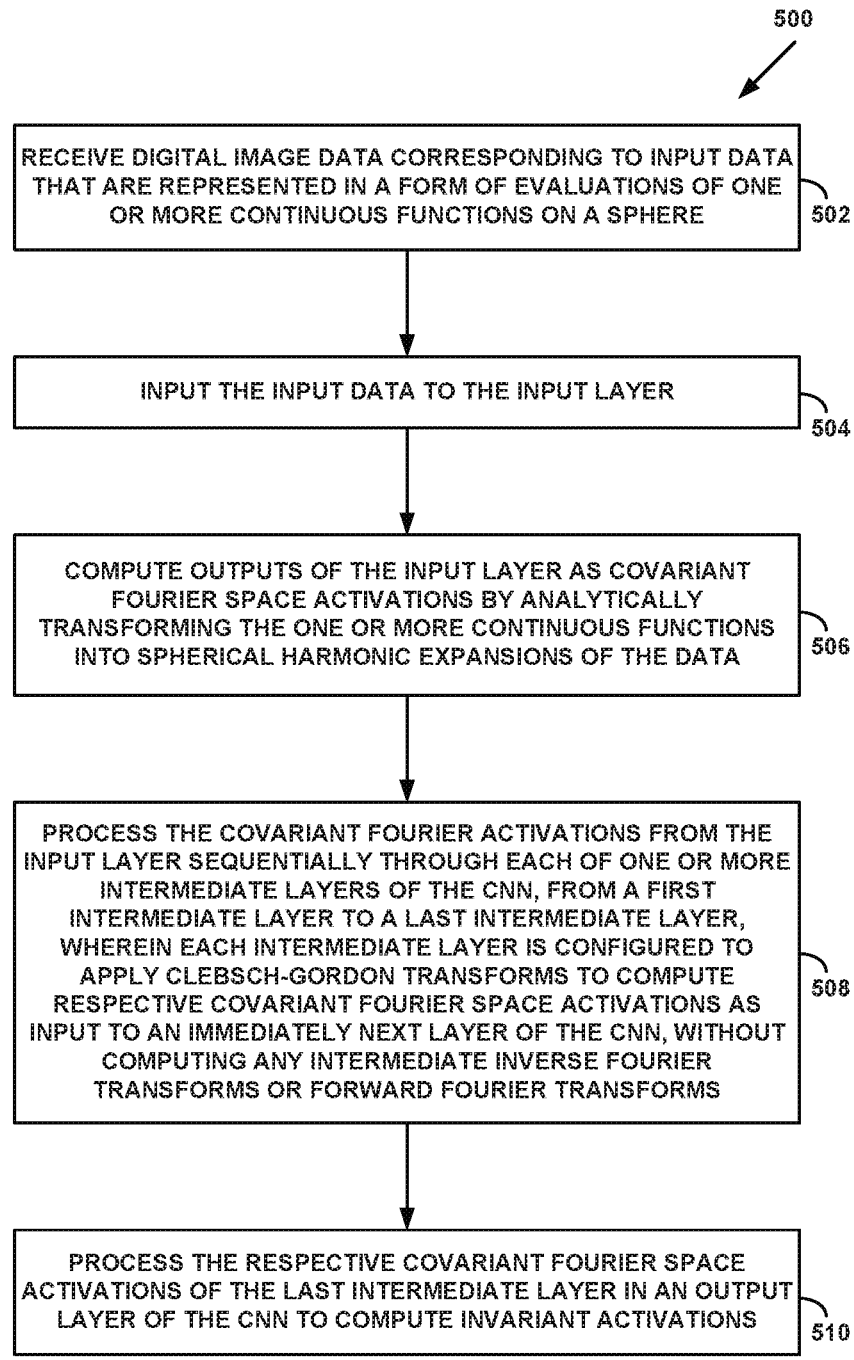
FIG. 5 is a flow chart of an example method, in accordance with example embodiments.

FIG. 5 is a flow chart of an example method 500, according to example embodiments. Specifically, example method 500 may be used for computationally processing data with a multi-layer convolutional neural network (CNN) implemented in the computing device and having an input layer, an output layer, and one or more intermediate layers. The steps of example method 500 may be carried out by a computing device, such as computing device 100. By way of example, the method 500 is applied to digital imaging data. However, application of the spherical CNN is not limited to digital imaging data.

At step 502, the computing device may receive digital image data corresponding to input data that are represented in a form of evaluations of one or more continuous functions on a sphere.

At step 502, the input data are taken as input to the input layer.

At step 506, outputs of the input layer are computed as covariant Fourier space activations by analytically transforming the one or more continuous functions into spherical harmonic expansions of the data.

At step 508, the covariant Fourier activations from the input layer are processed sequentially through each of the one or more intermediate layers of the CNN, from the first intermediate layer to the last intermediate layer. Specifically, each intermediate layer is configured to apply Clebsch-Gordan transforms to compute respective covariant Fourier space activations as input to an immediately next layer of the CNN, an in particular, to do so without computing any intermediate inverse Fourier transforms or forward Fourier transforms.

Finally, at step 510, the respective covariant Fourier space activations of the last intermediate layer are processed in the output layer of the CNN to compute invariant activations.

In accordance with example embodiments, computing the respective covariant Fourier space activations at each of the one or more intermediate layer and the invariant activations at the output layer may entail applying respective weighting parameters at each layer.

In further accordance with example embodiments, the input data may be training data, in which case the method may further entail training the CNN by learning values for the respective weighting parameters In accordance with example embodiments, the method may further entail inputting the invariant activations of the output layer to a fully connected neural network.

In accordance with example embodiments, the digital image data may include or consist of image data on a sphere. As such, the evaluations of one or more continuous functions on a sphere may correspond to pixel values of one or more channels. In an example application, the one or more channels comprise a red channel, a blue channel, and a green channel. However, the channels may correspond to other color values.

In accordance with example embodiments, the digital image data may include or consist of volumetric (3D) image data of a three-dimensional region of an object. In an example application with 3D images, the volumetric image data may be magnetic resonance imaging data and/or computer tomography data.

In accordance with example embodiments, the CNN may have S+1 layers, s=0, ..., S, where s=0 corresponds to the input layer, s=S corresponds to the output layer, and s=1, ..., S−1 corresponds to the intermediate layers, and the spherical harmonic expansions of the data may correspond to spherical harmonic functions $Y_l^m(\theta,\phi)$, l=0 ..., L. With this arrangement, computing, for each of the CNN layers s=1, ..., S−1, respective covariant Fourier space activations from output activations of the immediately preceding layer, s−1, without computing any intermediate inverse Fourier transforms or forward Fourier transforms, may entail: forming a plurality of l-ordered, pair-wise Kronecker products of the outputs of layer s−1, decomposing each Kronecker product into covariant blocks using a Clebsch-Gordan transform, and applying respective weightings to concatenations the covariant blocks of like l.

In further accordance with example embodiments, processing the respective covariant Fourier space activations of the last intermediate layer in the output layer of the CNN to compute invariant activations may entail computing, for the s=S layer of the CNN, an invariant activation by computations used for CNN layers s=1, ..., S−1, but omitting computations for l>0.

CONCLUSION

An SO(3)-equivariant neural network architecture for spherical data that operates completely in Fourier space has been presented herein. In accordance with example embodiments, this approach circumvents a major drawback of earlier models that need to switch back and forth between Fourier space and "real" space. This achieved by a novel and unconventionally approach that uses the Clebsch-Gordan decomposition as the only source of nonlinearity. While the specific focus is on spheres and SO(3)-equivariance, the approach is more widely applicable, suggesting a general formalism for designing fully Fourier neural networks that are equivariant to the action of any compact continuous group.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method, carried out by a computing device, for computationally processing data with a multi-layer convolutional neural network (CNN) implemented in the computing device and having an input layer, an output layer, and one or more intermediate layers, the method comprising:
   at the computing device, receiving digital image data corresponding to input data that are represented in a form of evaluations of one or more continuous functions on a sphere;
   inputting the input data to the input layer;
   computing outputs of the input layer as covariant Fourier space activations by analytically transforming the one or more continuous functions into spherical harmonic expansions of the data;
   processing the covariant Fourier activations from the input layer sequentially through each of the one or more intermediate layers of the CNN, from the first intermediate layer to the last intermediate layer, wherein each intermediate layer is configured to apply Clebsch-Gordan transforms to compute respective covariant Fourier space activations as input to an immediately next layer of the CNN, without computing any intermediate inverse Fourier transforms or forward Fourier transforms; and processing the respective covariant Fourier space activations of the last intermediate layer in the output layer of the CNN to compute invariant activations.

2. The method of claim 1, wherein computing the respective covariant Fourier space activations at each of the one or more intermediate layer and the invariant activations at the output layer comprises applying respective weighting parameters at each layer.

3. The method of claim 2, wherein the input data comprise training data, and the method further comprises training the CNN by learning values for the respective weighting parameters.

4. The method of claim 1, further comprising inputting the invariant activations of the output layer to a fully connected neural network.

5. The method of claim 1, wherein the digital image data comprise image data on a sphere, and wherein the evaluations of one or more continuous functions on a sphere comprise pixel values of one or more channels.

6. The method of claim 5, wherein the one or more channels comprise a red channel, a blue channel, and a green channel.

7. The method of claim 1, wherein the digital image data comprise volumetric image data of a three-dimensional region of an object.

8. The method of claim 7, wherein the volumetric image data are one of magnetic resonance imaging data or computer tomography data.

9. The method of claim 1, wherein the CNN has S+1 layers, s=0, . . . , S, wherein s=0 corresponds to the input layer, s=S corresponds to the output layer, and s=1, . . . , S−1 corresponds to the intermediate layers, wherein the spherical harmonic expansions of the data correspond to spherical harmonic functions $Y_l^m(\theta,\phi)$, l=0, . . . , L, and wherein processing the covariant Fourier activations from the input layer sequentially through each of the one or more intermediate layers of the CNN comprises:

for each of the CNN layers s=1, . . . , S−1, computing respective covariant Fourier space activations from output activations of the immediately preceding layer, s−1, without computing any intermediate inverse Fourier transforms or forward Fourier transforms, by:

forming a plurality of l-ordered, pair-wise Kronecker products of the outputs of layer s−1;

decomposing each Kronecker product into covariant blocks using a Clebsch-Gordan transform; and applying respective weightings to concatenations the covariant blocks of like l.

10. The method of claim 9, wherein processing the respective covariant Fourier space activations of the last intermediate layer in the output layer of the CNN to compute invariant activations comprises:

for the s=S layer of the CNN, computing an invariant activation by computations used for CNN layers s=1, . . . , S−1, but omitting computations for l>0.

11. A computing system configured for computationally processing data with a multi-layer convolutional neural network (CNN), the computing system comprising:

one or more processors; and memory configured to store computer-executable instructions that, when executed by the one or more processors, cause the computing system to carry out operations including:

implementing the multi-layer CNN in an architectural form having an input layer, an output layer, and one or more intermediate layers, from a first intermediate layer to a last intermediate layer;

receiving digital image data corresponding to input data that are represented in a form of evaluations of one or more continuous functions on a sphere;

at the input layer:

inputting the input data to the input layer;

computing covariant Fourier space activations by analytically transforming the one or more continuous functions into spherical harmonic expansions of the input data; and outputting the computed covariant Fourier space activations to the first intermediate layer;

at each intermediate layer:

receiving as input activations from an immediately-preceding layer of the CNN;

processing the received input activations by applying Clebsch-Gordan transforms to compute respective covariant Fourier space activations without computing any intermediate inverse Fourier transforms or forward Fourier transforms; and outputting the computed respective covariant Fourier space activations to an immediately next layer of the CNN;

at the output layer:

receiving as input the computed covariant Fourier space activations of the last intermediate layer;

processing the received covariant Fourier activations of the last intermediate layer by computing invariant activations; and outputting the computed invariant activations.

12. The computing system of claim 11, wherein computing the respective covariant Fourier space activations at each of the one or more intermediate layer and the invariant activations at the output layer comprises applying respective weighting parameters at each layer.

13. The computing system claim 11, wherein the input data comprise training data, and wherein computing the respective covariant Fourier space activations at each of the one or more intermediate layer and the invariant activations at the output layer comprises training the CNN by learning values for the respective weighting parameters.

14. The computing system of claim 11, wherein the operations further include:

implementing a fully connected neural network; and the output layer outputting the computed invariant activations to the fully connected neural network.

15. The computing system of claim 11, wherein the digital image data comprise image data on a sphere, and wherein the evaluations of one or more continuous functions on a sphere comprise pixel values of one or more channels.

16. The computing system of claim 15, wherein the one or more channels comprise a red channel, a blue channel, and a green channel.

17. The computing system of claim 11, wherein the digital image data comprise volumetric image data of a three-dimensional region of an object.

18. The computing system of claim 11, wherein the CNN has S+1 layers, s=0, . . . , S, wherein s=0 corresponds to the input layer, s=S corresponds to the output layer, and s=1, . . . , S−1 corresponds to the intermediate layers, wherein the spherical harmonic expansions of the data correspond to spherical harmonic functions $Y_l^m(\theta,\phi)$, l=0, . . . , L, and wherein processing the covariant Fourier activations at each intermediate layer comprises:

for each of the CNN layers s=1, . . . , S−1, computing respective covariant Fourier space activations from output activations of the immediately preceding layer, s−1, without computing any intermediate inverse Fourier transforms or forward Fourier transforms, by:

forming a plurality of l-ordered, pair-wise Kronecker products of the outputs of layer s−1;

decomposing each Kronecker product into covariant blocks using a Clebsch-Gordan transform; and applying respective weightings to concatenations the covariant blocks of like l.

19. The computing system of claim 18, wherein processing the received covariant Fourier activations of the last intermediate layer by computing invariant activations comprises:

for the s=S layer of the CNN, computing an invariant activation by computations used for CNN layers s=1, . . . , S−1, but omitting computations for l>0.

20. A non-transitory computer-readable medium having instructions stored thereon that, when carried out by one or more processors of a computing device, cause the computing device to carry out operations including:

implementing a multi-layer convolutional neural network (CNN) comprising an input layer, an output layer, and one or more intermediate layers, from a first intermediate layer to a last intermediate layer;

receiving digital image data corresponding to input data that are represented in a form of evaluations of one or more continuous functions on a sphere;

inputting the input data to the input layer;

computing outputs of the input layer as covariant Fourier space activations by analytically transforming the one or more continuous functions into spherical harmonic expansions of the data;

processing the covariant Fourier activations from the input layer sequentially through each of the one or more intermediate layers of the CNN, from the first intermediate layer to the last intermediate layer, wherein each intermediate layer is configured to apply Clebsch-Gordan transforms to compute respective covariant Fourier space activations as input to an immediately next layer of the CNN, without computing any intermediate inverse Fourier transforms or forward Fourier transforms; and processing the respective covariant Fourier space activations of the last intermediate layer in the output layer of the CNN to compute invariant activations.

* * * * *